United States Patent [19]
Yaita et al.

[11] Patent Number: 5,326,517
[45] Date of Patent: Jul. 5, 1994

[54] METHOD OF FORMING FINISHED CUPS OF EXPANDED RESIN

[75] Inventors: Masato Yaita; Toshikazu Ohmori, both of Koga, Japan

[73] Assignee: Sekisui Kaseihin Kogyo Kabushiki Kaisha, Nara, Japan

[21] Appl. No.: 907,474

[22] Filed: Jul. 1, 1992

Related U.S. Application Data

[62] Division of Ser. No. 599,769, Oct. 18, 1990, Pat. No. 5,127,815.

[30] Foreign Application Priority Data

Oct. 31, 1989 [JP] Japan ................................. 1-284452
Mar. 7, 1990 [JP] Japan ................................. 2-057470

[51] Int. Cl.$^5$ ............................................ B29C 67/22
[52] U.S. Cl. ..................................... 264/51; 264/321; 264/334; 264/335
[58] Field of Search .................. 264/40.1, 51, 53, 321, 264/268, 334, 126, 335; 425/397, 398

[56] References Cited

U.S. PATENT DOCUMENTS

| | | | |
|---|---|---|---|
| 3,069,725 | 12/1962 | Root | 425/397 |
| 3,479,694 | 11/1969 | Winstead | 264/321 |
| 3,605,192 | 9/1971 | Edwards | 425/397 |
| 3,703,255 | 11/1972 | Wade | 264/321 |
| 3,792,137 | 2/1974 | Seto | 264/321 |
| 3,874,830 | 4/1975 | Carter et al. | 425/394 |
| 3,957,415 | 5/1976 | Edwards | 425/403 |
| 3,982,635 | 9/1976 | Chin et al. | 425/397 |
| 3,982,872 | 9/1976 | Kauffman et al. | 425/397 |
| 4,060,577 | 11/1977 | Collins | 264/321 |
| 4,106,884 | 8/1978 | Jegelka | 425/403.1 |
| 4,260,571 | 4/1981 | Ritter | 264/321 |
| 4,359,160 | 11/1982 | Myers et al. | 264/321 |
| 4,360,491 | 11/1982 | Holden, Jr. | 425/398 |
| 4,376,090 | 3/1983 | Marcus | 264/530 |
| 4,442,064 | 4/1984 | Myers et al. | 264/321 |
| 4,534,927 | 8/1985 | Morioka et al. | 264/321 |
| 4,571,320 | 2/1986 | Walker | 264/40.1 |
| 4,579,275 | 4/1986 | Peelman et al. | 264/321 |
| 4,758,394 | 7/1988 | Yaita et al. | 264/321 |
| 4,878,970 | 11/1989 | Schubert et al. | 264/321 |
| 5,176,607 | 1/1993 | Hill et al. | 264/321 |

FOREIGN PATENT DOCUMENTS

| | | | |
|---|---|---|---|
| 1291470 | 3/1969 | Fed. Rep. of Germany . | |
| 48-044182 | 12/1973 | Japan | 264/321 |
| 48-044184 | 12/1973 | Japan | 264/321 |
| 49-020621 | 5/1974 | Japan | 264/321 |
| 63-153119 | 6/1988 | Japan . | |

Primary Examiner—Allan R. Kuhns
Attorney, Agent, or Firm—Nikaido, Marmelstein, Murray & Oram

[57] ABSTRACT

A method of and an apparatus for forming finished cups of expanded resin of the present invention employ a transfer mold capable of transferring a performed article obtained through a preforming process to the female member of a finish-forming mold, and simultaneously collecting from the male member of the finish-forming mold a finished article, obtained through compression forming and discharging it after an inspection process, and enable a first process where the transfer mold receives a preformed article through a feeding device, a second process where the finished article is discharged from the transfer mold to a sorting device wherein conforming articles are counted and stacked, and a third process where another preformed article is heated and compressed within the finish-forming mold, to be conducted simultaneously. Further, a fourth process where the preformed article is transferred by the transfer mold to the female member of the finish-forming mold, and a fifth process where the finished article is transferred from the male member of the finish-forming mold to the transfer mold can be conducted simultaneously. Also, a sixth process where the conformity of the finished article is checked, and a seventh process where defective articles are removed and conforming articles are counted, are executed while the transfer mold is moving. The time required to perform all the processes is thus significantly reduced.

13 Claims, 15 Drawing Sheets

FIG. 6
FIG. 7
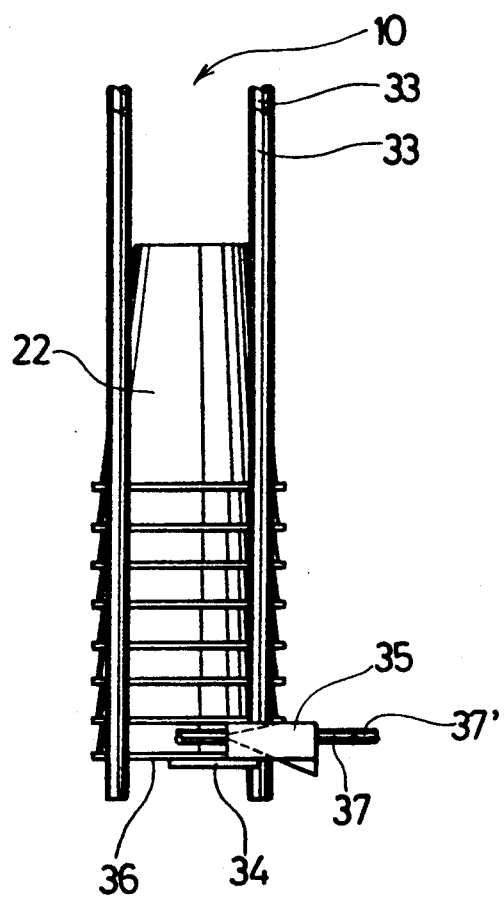
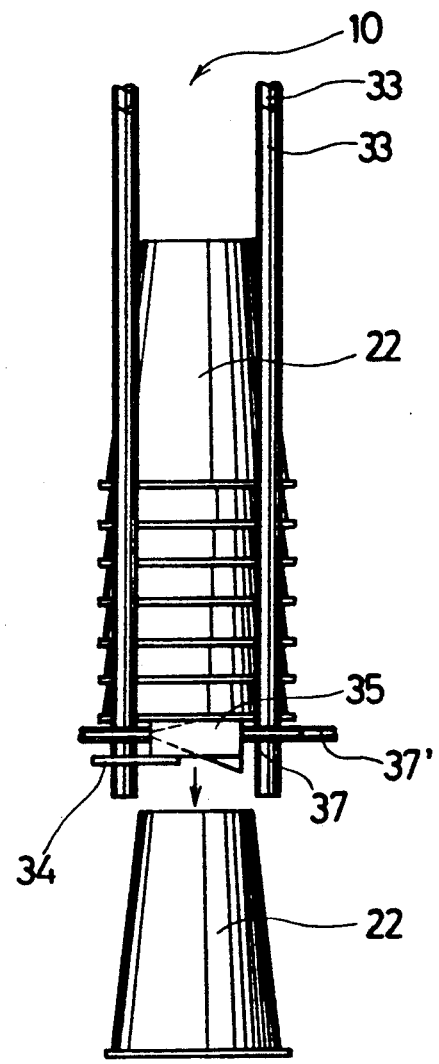

FIG. 8
FIG. 9
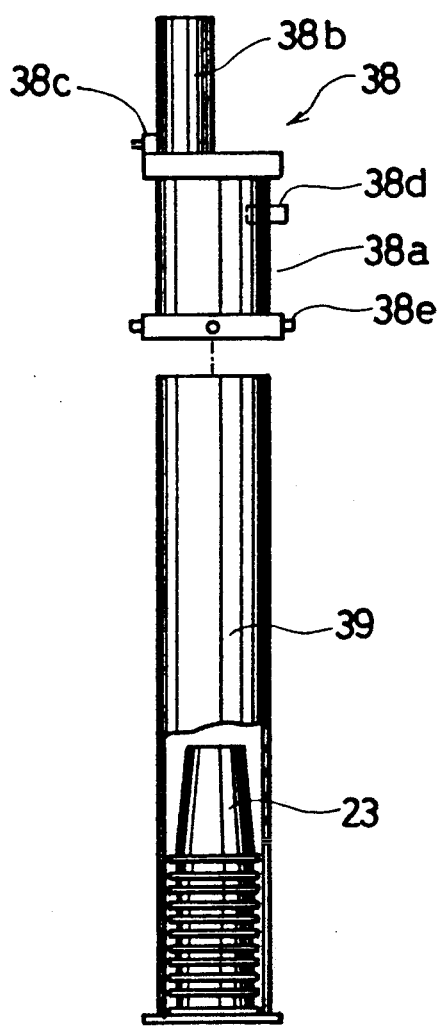
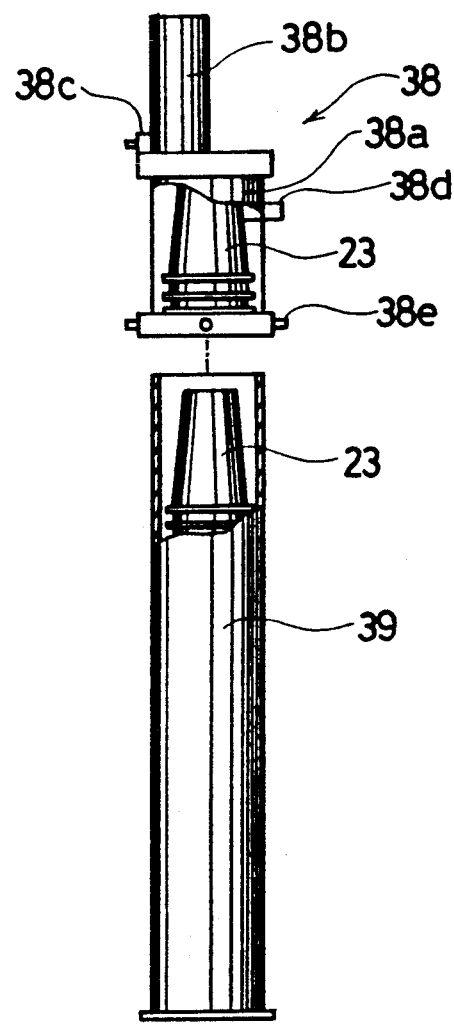

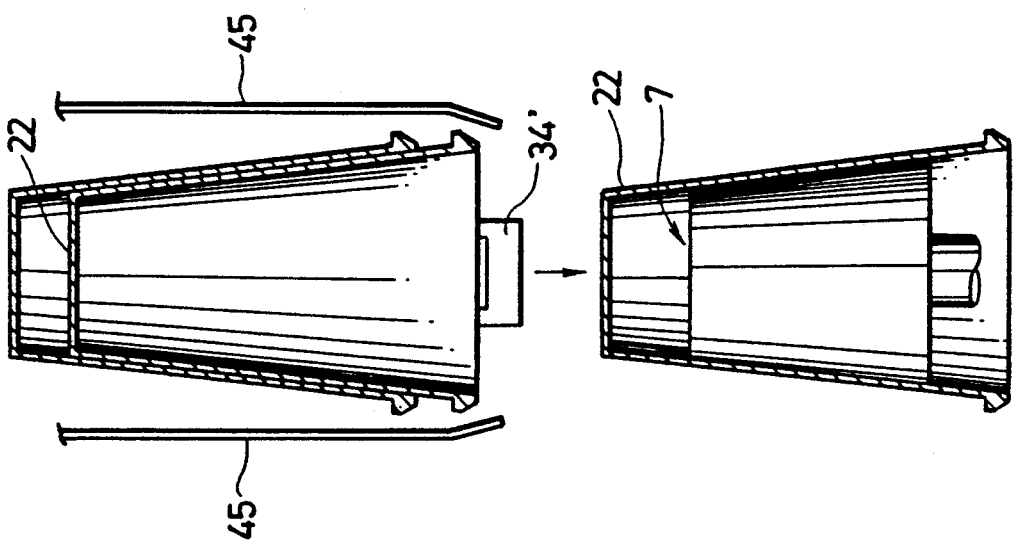
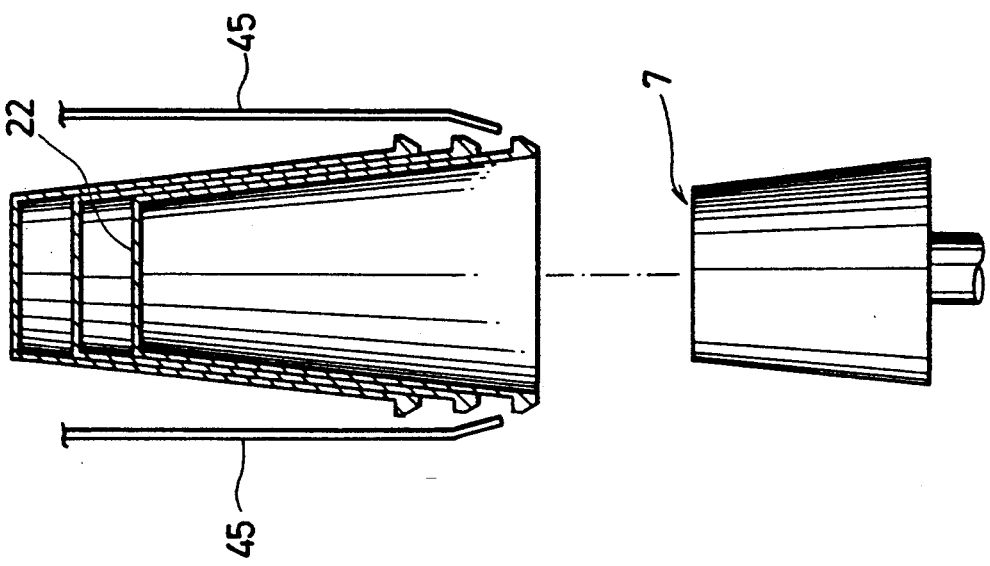
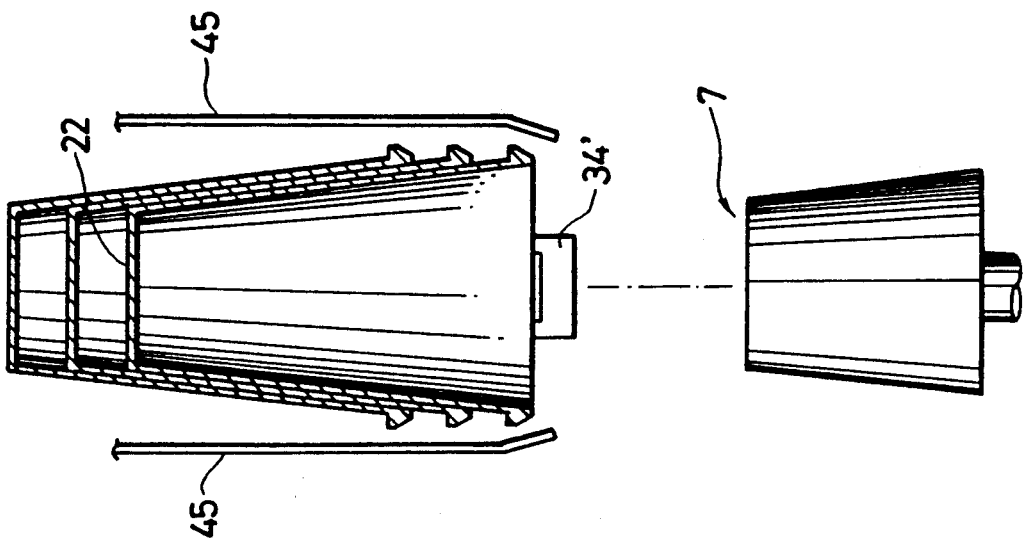

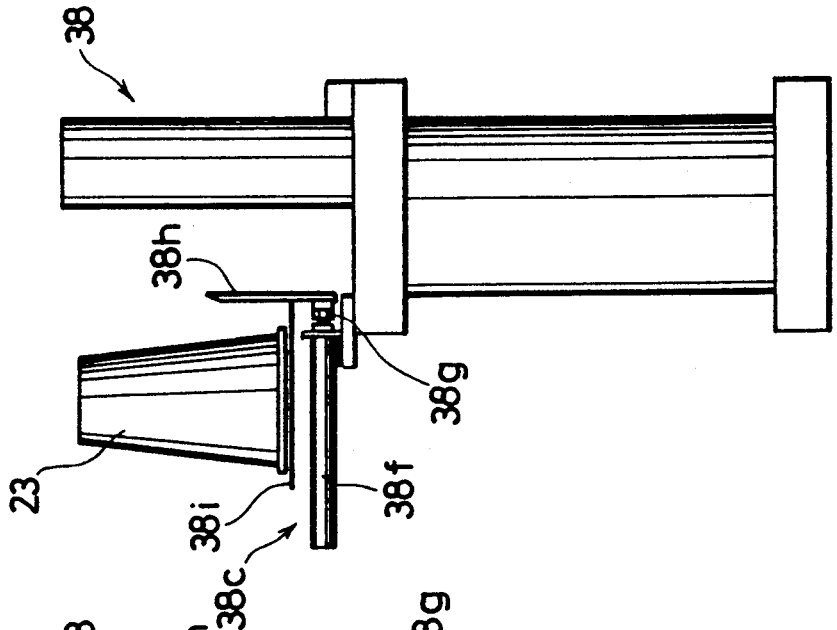
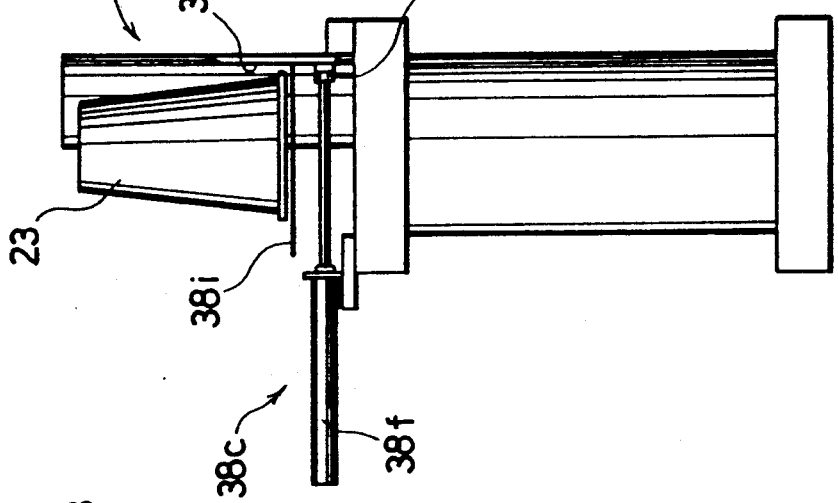
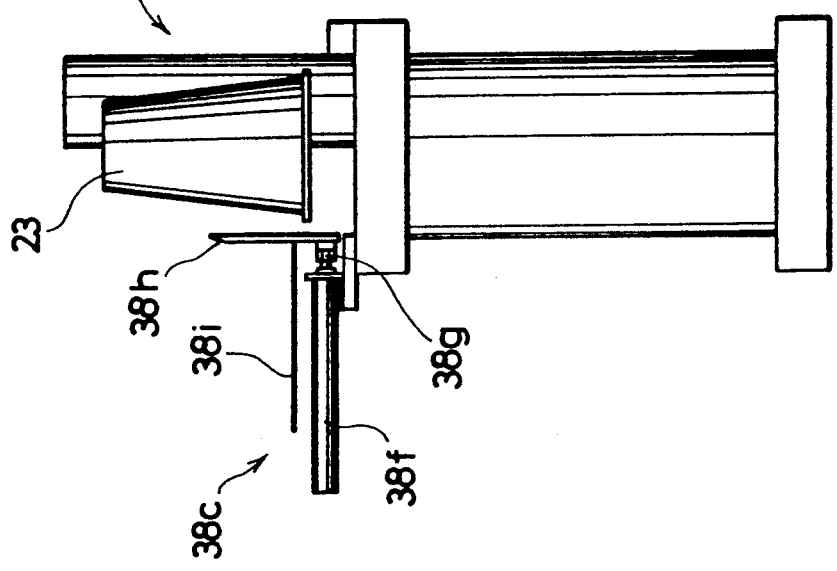

METHOD OF FORMING FINISHED CUPS OF EXPANDED RESIN

This is a division, of application Ser. No. 599,769 filed Oct. 18, 1990, now U.S. Pat. No. 5,127,815.

FIELD OF THE INVENTION

The present invention relates to a method of and apparatus for forming finished cups of expanded resin. The present invention especially relates to a method of and an apparatus for improving the efficiency in producing thin-walled finished articles by compressively forming preformed articles.

BACKGROUND OF THE INVENTION

A conventional method of forming containers of expanded resin, such as for example expanded polystyrene containers, consists in filling the cavity of metal mold with expandable thermoplastic resin particles, for instance expandable polystyrene beads, heating the particles to be expanded and fused, and cooling the same. So-called expanded polystyrene containers produced in the above fashion are widely used in the distribution stage and consumption stage due to their combined properties of high forming accuracy, excellent heat insulation, and great strength-to-weight ratio. Containers for instant noodles, cups for beverage, etc. can be cited as familiar examples.

When expanded polystyrene containers are designed for containing a liquid substance, they must be produced such that the liquid substrate contained therein does not leak. In addition, when the expanded polystyrene containers are formed in a slender and deep tapering shape, such as for example, cups for beverage etc., a so-called stacking height or the height of cups stacked as fitted in one another, should be as low as possible to improve the housing efficiency in storage and transportation of the cups. To reduce the stacking height, thin-walled containers should be made. However, if, in order to produce thin-walled containers, the quantity of resin particles filled in the cavity formed when the female member and the male member of a metal mold are closed, is reduced, the walls of the cups inevitably contain pin-holes or gaps whereby the water-tightness of the containers cannot be assured.

A method of forming thin-walled containers made of expanded resin having a satisfactory strength-to-weight ratio, while maintaining a mass equivalent to conventional thick-walled containers of expanded resin, is disclosed in Japanese Publication for Examined Patent Application No. 8744-1973 (Tokukosho No. 48-8744) and Japanese Publication for Unexamined Patent Application No. 142668-1975 (Tokukaisho No. 50-142668). Such a method consists in compressing and reducing the wall thickness of the containers prior to or after a cooling process, after the resin particles are expanded through heat. However, cups having a wall thickness equal to 0.5 mm such as for example thin-walled cups that can be employed in automatic vending machines of beverages, could not be formed with such a method. Moreover, the problem of water-tightness is left unresolved.

A method solving the problem of water-tightness and shortening the forming cycle time is disclosed in Japanese Publication for Unexamined Patent Application No. 153119-1988 (Tokukaisho No. 63-153119; Japanese Publication for Unexamined Patent Application No. 153119-1988 corresponds to U.S. Pat. No. 4,758,394). This method consists in conducting the forming process of preformed articles (hereinafter referred to as preforming process) and the forming process of finished articles (hereinafter referred to as finish-forming process), in a closed chamber designed such that the interior pressure thereof can be controlled. With this method, resin particles are expanded through heat during the preforming process in an atmosphere controlled to an atmospheric pressure such that the resin particles do not expand unrestrictedly. The preformed article is then locked into a metal mold having a spatial width smaller than the metal mold employed during the preforming process, and re-heated and mechanically compressed at the same time during the finish-forming process, thereby producing a thin-walled expanded resin cup. With this method the preformed article can uniformly be heated to be fused. This method thus enables the production of water-tight cups having a wall thickness equal to 0.5 mm. In addition, the preformed article is kept in a heated state while it is transferred to be subjected to the finish-forming process. Therefore, the time needed for re-heating during the finish-forming process is reduced and the forming cycle is shorter than a conventional forming cycle.

FIG. 17 schematically illustrates the forming process adopted in the forming method disclosed in Japanese Publication for Unexamined Patent No. 153119-1988 (Tokukaisho No. 63-153119, U.S. Pat. No. 4,758,394). Processes designated with the same step number in the preforming process and the finish-forming process, such as for instance S21 and S21' are conducted simultaneously.

During the preforming process, the female member and the male member of a preforming mold lock thereby forming a preformed article (S21'). The female member of the preforming mold is then lifted up to open the preforming mold (S23'). A cylinder connected to the male member of the preforming mold is then operated to move horizontally the male member whereon the preformed article is disposed toward the finish-processing side (S24'). The preformed article is released (S25') from the male member of the preforming mold that is then returned to its original position in the preforming processing side (S27'). The preforming process is thus completed.

Meanwhile, during the finish-forming process, the preformed article is transferred from the male member of the preforming mold to the female member of a finish-forming mold (S25). The female member of the finish-forming mold is temporarily lifted up (S26) and after the male member of the preforming mold is returned to its original position in the preforming processing side, the female member and the male member of the finish-forming mold lock, thereby enabling the preformed article to be compressed and formed into a finished article (S28). The male member of the finish-forming mold is then moved down (S29) and the finished article is discharged (S21). The female member of the finish-forming mold is lifted up (S23) after the male member of the finish-forming mold was moved up again to prevent the inner pressure of the closed chamber from decreasing (S22). The female member of the finish-forming mold then stays in a standby state until the arrival of another preformed article (S25). The finish-forming process cycle is thus completed.

With a method of forming containers of expanded resin through the fusion of resin particles such as described above, the finished articles cannot be prevented from having pinholes due to insufficient heating, insufficient expanding, etc. In addition, holes might also appear in the preformed article during the preforming process due to a defective action of a raw material feeder, or a defective fusion of the resin particles. There also might be some instances where crackles develop during the finish-forming process due to defective heating and/or cooling conditions. A test for detecting defective articles is thus indispensable. A conventional method for detecting defective articles consists in, for example, pouring a liquid substance such as water or other substance into the finished article and visually checking whether it leaks.

However, the above conventional method suffers from the drawback that the supply of the preformed article and the discharge of the finished article cannot be conducted efficiently within a short time during the finish-forming process. A shorter forming cycle is thus desirable.

SUMMARY OF THE INVENTION

An object of the present invention is to provide a method and an apparatus capable of shortening the compression forming cycle during the process of forming preformed articles into finished articles, thereby improving the forming efficiency for finished articles and significantly reducing the manufacturing cost of cups of expanded resin.

Another object of the present invention is to provide a method and an apparatus whose functions for forming finished articles include various functions such as inspection of finished articles and other functions thereby permitting to further reduce the manufacturing cost of cups of expanded resin.

In order to achieve the above objects, a finish-forming method for producing cups of expanded resin in accordance with the present invention is characterized in employing transferring means for conveying a preformed article which was subjected to a preforming process and was supplied thereto, to the female member of a finish-forming mold while at the same time collecting a finished article from the male member of the finish-forming mold, and for discharging the finished article after it was subjected to an inspection process. The performed article is produced by filling expandable thermoplastic resin particles into the cavity of a preforming mold, and heating the resin particles to be expanded and fused through indirect heat such as steam, etc., during a preforming process. The preformed article is then compressed through heat during a finish-forming process, and a finished article whose wall thickness is thinner than that of the preformed article is formed.

The finish-forming method for forming cups of expanded resin in accordance with the present invention, permits performing the following three processes simultaneously: a first process where the transferring means collects a preformed article after the preformed article was subjected to a performing process, a second process where a finished article is discharged from the transferring means, and a third process where another preformed article is compressed though heat in a finish-forming mold and formed into a finished article. In addition, a fourth process where the transferring means conveys the preformed article collected after the preformed article was subjected to a performing process to, for example, the female member, and a fifth process where the finished article that was compressed through heat is transferred from, for example, the male member to the transferring means, can be conducted simultaneously. Further, a sixth process where the finished article is subjected to an inspection in the transferring means, and a seventh process where the finished articles discharged by the transferring means that were judged to be defective are removed and the conforming articles are counted, can be performed while the transferring means is moving to and fro. The number of processes executed in practice is thus reduced.

In order to achieve the above objects, an apparatus for forming finished cups of expanded resin in accordance with the present invention comprises feeding means for supplying a preformed article to the apparatus for forming finished articles, transferring means for collecting the preformed article from the feeding means and transferring it to a finish-forming mold, collecting a finished article from the finish-forming mold, and discharging the finished article after the finished article was subjected to an inspection, sorting means for removing the articles that were judged to be defective among the finished articles discharged from the transferring means, counting and stacking the conforming articles, and moving means for moving the transferring means to positions where the central axis of the transferring means and the central axis of the feeding means, the central axis of the transferring means and the central axis of the finish-forming mold, and the central axis of the transferring means and the central axis of the sorting means are respectively joined by a vertical line.

According to the above arrangement, after the preformed article was supplied to the transferring means, the moving means shifts the transferring means to a position where the central axis of the transferring means and the central axis of the finish-forming mold are joined by a vertical line. Then, the transferring means accurately transfers the preformed article to, for example, the female member of the finish-forming mold, and accurately collects the finished article from, for example, the male member of the finish-forming mold. After the transferring means collected the finished article, the moving means shifts the transferring means to a position where the central axis of the transferring means is joined by a vertical line with the central axis of the feeding means and the central axis of the sorting means. While the transferring means is moving, the finished article is subjected to an inspection in the transferring means. Then another preformed article is accurately supplied again to the transferring means, while at the same time the finished article is accurately discharged and sent from the transferring means to the sorting means. The transferring means is then moved again in order to convey the preformed article that was supplied thereto toward the finish-forming mold. Simultaneously with the motion of the transferring means, in the sorting means the finished article is removed when it was judged to be defective, and is counted and stacked when it was judged to be conforming.

As described above, the implementation of the transferring means permits to conduct the supply of the preformed article, the transfer of the preformed article to the finish-forming mold, the inspection and the discharge of the finished article very efficiently. In addition, the shipment of the conforming articles can be executed rapidly.

For a fuller understanding of the nature and advantages of the invention, reference should be made to the ensuing detailed description taken in conjunction with the accompanying drawings.

BRIEF DESCRIPTION OF THE DRAWINGS

FIG. 1 to FIG. 13 are views illustrating a first embodiment of the present invention.

FIG. 1 is a flow chart illustrating a finish-forming process of cups of expanded resin.

FIG. 2 is a front view of an apparatus for forming finished cups of expanded resin.

FIG. 3 is a side view illustrating the apparatus for forming finished cups of expanded resin shown in FIG. 2.

FIG. 4 is a side view showing the apparatus for forming finished cups of expanded resin when a finish-forming mold is closed.

FIG. 5 is a cross-sectional view showing a transfer mold.

FIG. 6 is an explanatory view showing essential parts of a stacking device holding preformed articles.

FIG. 7 is an explanatory view showing essential parts of the stacking device when it is releasing a preformed article.

FIG. 8 is a front view showing a sorting device and a stacking device for finished articles.

FIG. 9 is an explanatory view showing that the stacking device for finished articles needs to be replaced.

FIG. 10 is an explanatory view illustrating how a compression forming process, the supply of a preformed article, and the discharge of a finished article are conducted simultaneously.

FIG. 11 is an explanatory view illustrating a condition immediately before the preformed article is transferred to the finish-forming mold and before the finished article is transferred to the transfer mold.

FIG. 12 is an explanatory view illustrating a condition immediately after the preformed article was transferred to the finish-forming mold and after the finished article was transferred to the transfer mold.

FIG. 13 is a block diagram illustrating the junction connecting the cavity section of the transfer mold and a vacuum device.

FIG. 15 is an explanatory view illustrating how a preformed article is released by means of an air nozzle.

FIG. 16 is an explanatory view showing how a selecting stopper separates conforming articles and defective articles.

DESCRIPTION OF THE EMBODIMENTS

A first embodiment will be described hereinbelow with reference to FIG. 1 to FIG. 16.

Figure 2:
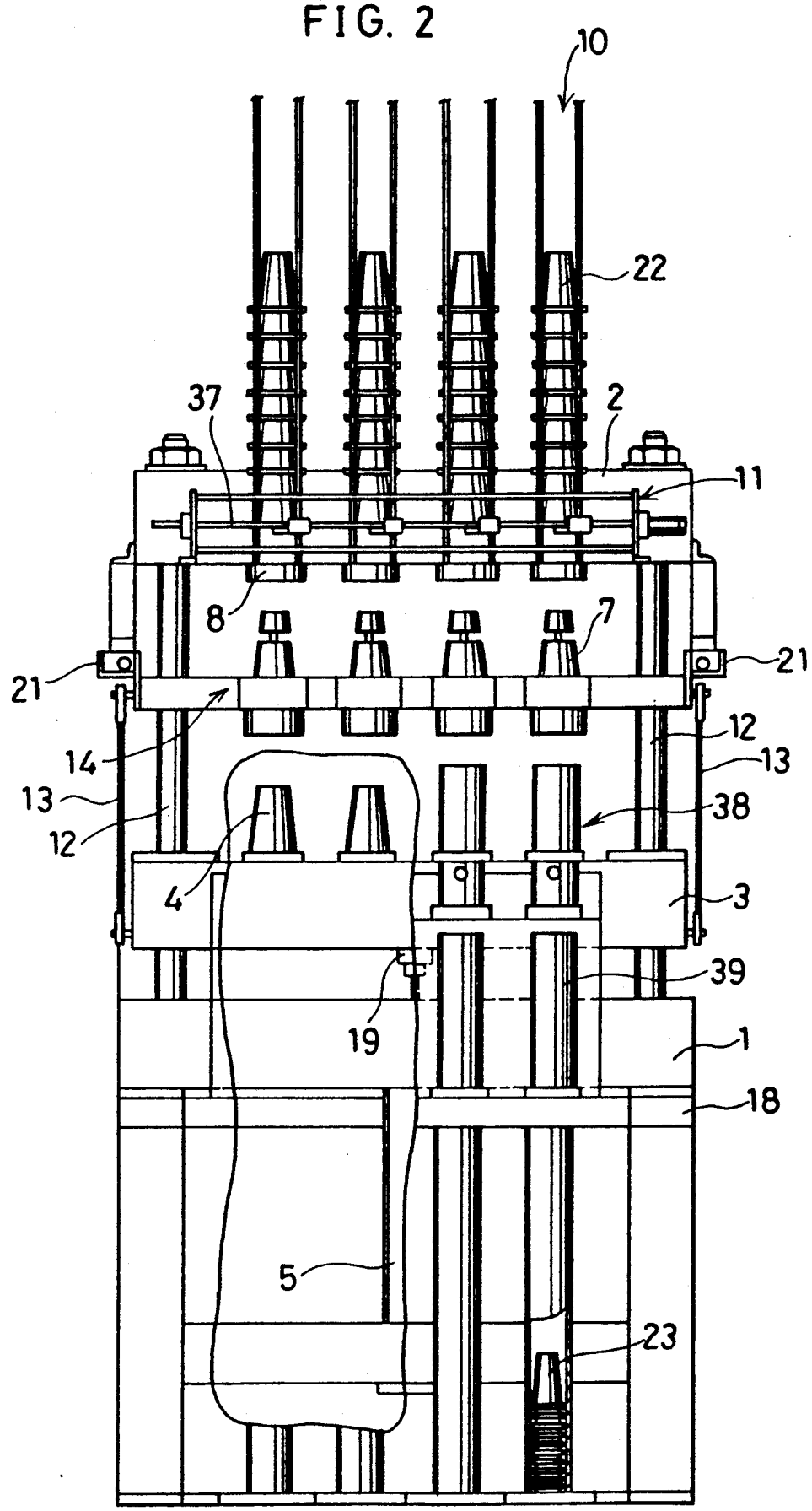
Figure 3:
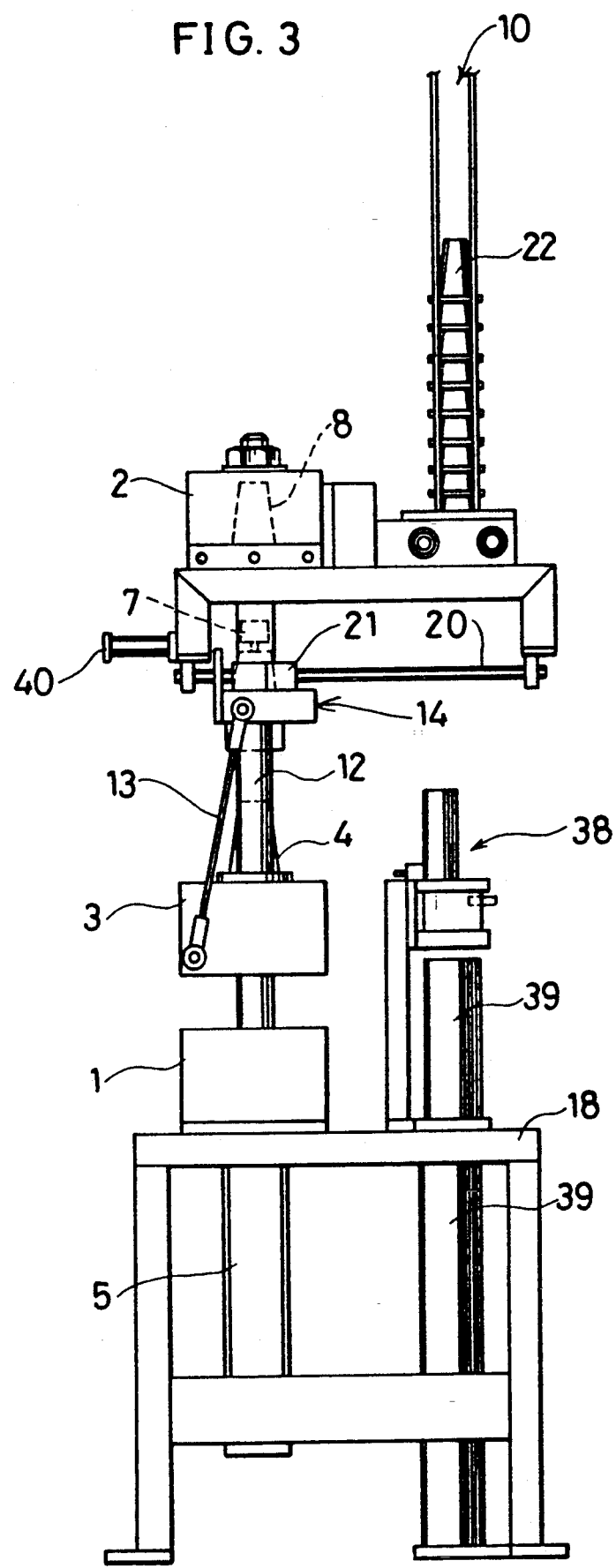
Figure 4:
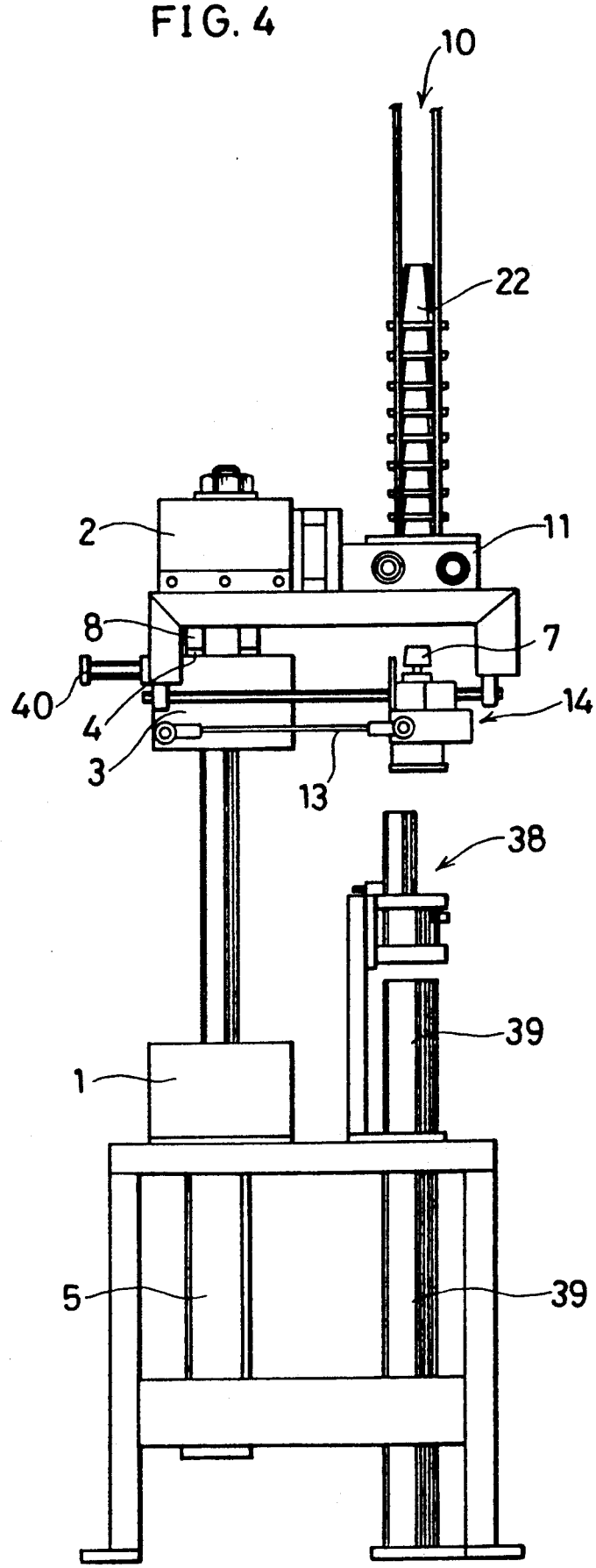

FIG. 2 to FIG. 4 illustrate essential parts of an apparatus for forming finished articles used for embodying a method for forming finished cups of expanded resin in accordance with the present invention.

As illustrated in the side view FIG. 3, the apparatus for forming finished articles comprises a lower fixed frame 1 attached to a frame table 18. An upper fixed frame 2 is disposed above the lower fixed frame 1, and is connected to the lower fixed frame 1 and supported by two connecting bars 12 in the vicinity of its left edge and of its right edge. A mobile frame 3 is pierced in the vicinity of its left edge and right edge by the connecting bars 12 and is horizontally fixed to a piston leading end 19 of a hydraulic cylinder 5 serving as mobile frame moving means.

A female member 8 is accommodated vertically in the upper fixed frame 2. The female member 8 is indirectly heated by steam or other mediums and cooled by cooling water or other mediums and forms one part of a finish-forming mold. A male member 4 is installed vertically upon the mobile frame 3. The male member 4 is heated and cooled in the same manner as the female member 8 and forms the other part of the finish-forming mold. The mobile frame 3 slides in a horizontal position between the lower fixed frame 1 and the upper fixed frame 2 up and down along the connecting bars 12, in response to the up and down motion of the piston leading end 19. As the mobile frame 3 slides up and down, the male member 4 is brought near to and is moved away from the fixed female member 8. The vertical movement of the male member 4 enables the finish-forming mold to be alternatively opened and closed. An air opening for letting air in/out and an airflow pipe, not shown, are formed in the female member 8. The male member 4 is accommodated with an air injection pipe and air injection outlet formed in the wall ceiling thereof, not shown. Pairs of the female member 8 and male member 4 may be also disposed in a desired number.

As illustrated in FIG. 3, a pair of horizontal shafts 20 are positioned in the lower section of the upper fixed frame 2, one horizontal shaft 20 on each side of the same. The two horizontal shafts 20 are disposed horizontally and oriented toward the front of the forming apparatus. A transfer mold 7 serving as transferring means, is installed upon a transferring device 14 in an upright position. Sliding connectors 21 belonging to transferring device coupling means, are mounted in a protruding fashion on both sides of the transferring device 14 and support the transferring device 14 horizontally. Each of the sliding connectors 21 are engaged respectively with each of the horizontal shafts 20 so as to be able to slide. A pair of connecting rods 13, belonging to the transferring device coupling means, are installed such that, one end of each connecting rod 13 is rotatably connected to the external wall of one of the sliding connectors 21, and the other end of each connecting rod 13 is rotatably connected to the lower section of one of the sides of the mobile frame 3. Accordingly, when the mobile frame 3 slides up and down along the connecting bars 12, the transferring device 14 moves in an interlocked manner and slides horizontally back and forth along the horizontal shafts 20 by means of the sliding connectors 21. Here, when provision is made such that a plurality of female members 8 and male members 4 are accommodated, the number of transfer molds 7 should be equal to the number of female members 8 and male members 4 installed.

Suppose now that the height and width of the transfer mold 7 have to be enlarged in order to form articles of a bigger size. In this case, as illustrated in FIG. 3, the connecting rods 13 should be mounted such that the mounting angle that the connecting rods 13 form with the vertical direction when the mobile frame 3 is moved to its lowest position, is reduced and the motion range of the transferring device 14 is enlarged. Such an arrangement prevents the male member 4 and the female member 8 from comming into contact with the transfer mold 7. When the mounting angle that the connecting rods 13 form with the vertical direction is small, an air cylinder 40 should be installed for pushing out and assisting the transferring device 14 to slide smoothly when the transferring device 14 starts moving. (Specifically, the mounting angle of the connecting rods 13 with respect to the vertical direction may be set to, for example, approximately 26° supposing that the distance separating the upper fixed frame 2 and the mobile fixed frame 3 is set to 500 mm, and that the maximum height of finished articles is set to 120 mm. If the maximum height for the finished articles is set to 150 mm, the mounting angle may be set to, for example, approximately 10°.)

Provision is made such that, when the mobile frame 3 reaches its lowest position, the transferring device 14 is located in a position where the central axis of the transfer mold 7 is joined by a vertical line with the central axis of the female member 8. When the mobile frame 3 moved to its highest position and is in the position shown in FIG. 4, i.e. when the female member 8 and the male member 4 are locked, the transferring device 14 slides and moves horizontally along the horizontal shafts 20 and reaches the forefront position of its sliding range. When, as described above, the transferring device 14 is located in the forefront position of its sliding range, the central axis of the transfer mold 7 is joined by a vertical line with a stacking device 10 serving as feeding means for supplying preformed articles installed upwards. In addition, the central axis of the transfer mold 7 is also joined by a vertical line with the central axis of a sorting device 38 and the central axis of a stacking device for finished articles 39.

The sorting device 38 is mounted vertically below the stacking device 10, and functions as sorting means for counting and letting pass therethrough the conforming finished articles and removing the defective ones. The stacking device for finished articles 39 is formed in the shape of an upright cylindrical pipe, and its opening is positioned right below the sorting device 38. Provision is made such that only the conforming articles that passed through the sorting device 38 are stacked in the stacking device for finished articles 39.

Preformed articles 22 are stacked and stored in the stacking device 10. Provision is made such that the preformed articles 22 are released one by one from the stacking device 10 and supplied to the transfer mold 7 by means of a releasing device 11 attached to the stacking device 10. When a plurality of transfer molds 7 are installed, the number of stacking devices 10 is equal to the number of transfer molds 7, (i.e. the number of female members 8 or male members 4). Similarly, the number of sorting devices 38 and the number of stacking devices for finished articles 39 are respectively equal to the number of transfer molds 7.

Specific parts of the apparatus for forming finished articles will be described in details hereinbelow with reference to FIGS. 5 to 9 and FIGS. 13 to 16.

Figure 5:
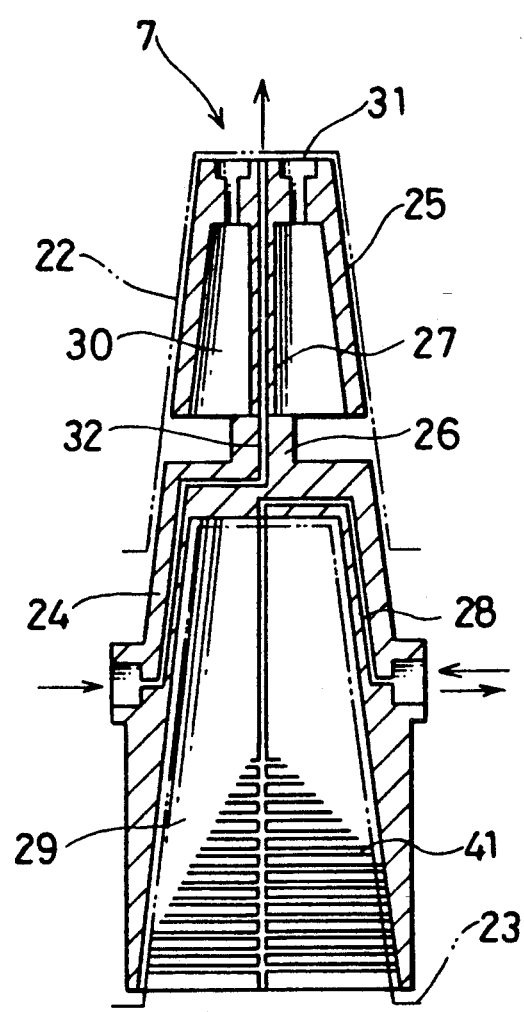

As illustrated in FIG. 5, the transfer mold 7 is composed of a cavity section 24 and a core section 25. The cavity section 24 is accommodated with a hollow space 29 that is shaped in accordance with the shape of finished articles 23. As to the core section 25, it is formed in a tapering shape in accordance with the shape of the preformed articles 22. An airflow pipe 28 is accommodated within the wall of the cavity section 24. The airflow pipe 28 is designed for aspirating air and reducing the air pressure in the hollow space 29 thereby permitting retention the finished article 23. One end of the airflow pipe 28 has an opening giving access to the hollow space 29 and formed in the internal ceiling wall of the cavity section 24. The airflow pipe 28 passes through the wall of the cavity section 24, and the other end thereof has an opening giving access to outside, formed in the external wall of the cavity section 24 and connected to a vacuum device, not shown, to be described later. The airflow pipe 28 also serves as an air injection pipe used for injecting air in the hollow space 29 at the time of the discharge of the finished article. Narrow grooves 41 are formed over the internal wall of the cavity section 24, except in portion of the cavity section 24 corresponding to the vicinity of the brim portion of the finished article 23. The narrow grooves 41 all communicate with each other through a passage and lead to the airflow pipe 28. The narrow grooves 41 are designed to facilitate the discharge of the finished article 23 through injection of air in the hollow space 29.

Figure 13:
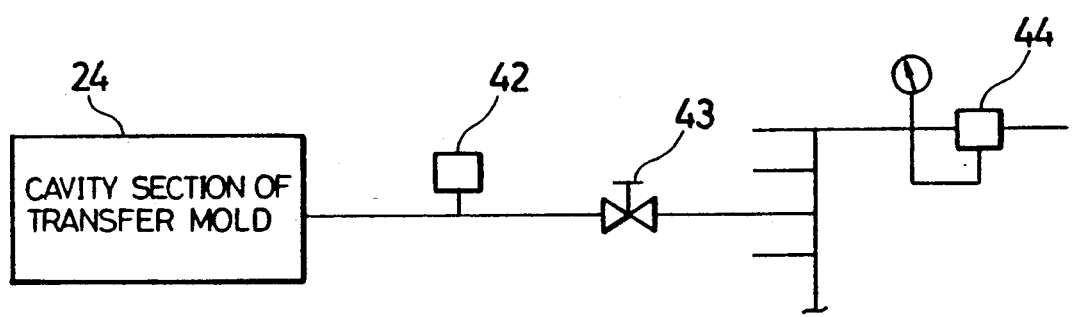

As illustrated in FIG. 13, the cavity section 24 of the transfer mold 7 is connected to a vacuum pressure sensor 42 for detecting the vacuum degree within the cavity section 24, and to a throttle valve 43 employed for controlling the suction speed of the vacuum device and for adjusting the sensitivity of the vacuum pressure sensor 42. The cavity section 24 is further connected to the vacuum device through a pipe and a vacuum pressure regulator 44 used for controlling the vacuum pressure and disposed on the main body of the forming apparatus. (When, a plurality of transfer molds 7 are installed, one vacuum pressure sensor 42 and one throttle valve 43 are mounted on each cavity section 24. In this case, the vacuum pressure sensors 42 and the throttle valves 43 are connected to the vacuum pressure regulator 44 by means of branched piping.). The members 24, 42, 43, 44 and the vacuum device are connected by flexible tubes.

Accordingly, the between the cavity section 24 and the finished article 23 is detected by the vacuum pressure sensor 42 after air was exhausted from the cavity section 24 via the airflow pipe 28 through the action of the vacuum device. If the finished article 23 has pinholes or other faults, a vacuum degree that is lower than that of a conforming article is detected by the vacuum pressure sensor 42 whereby judgement is made that the finished article 23 is defective. When, as described above, the vacuum pressure sensor 42 is adopted for detecting pinholes and other faults formed in the finished article 23, the suction pressure and the suction speed need to be controlled. The vacuum pressure adjustment performed by the vacuum pressure regulator 44 aims at reducing the number of detection errors and at assuring that faults are detected accurately. The suction speed control performed by the throttle valve 43 aims at preventing that the sensitivity of the vacuum pressure sensor 42 deteriorates due to excessive suction speed.

Meanwhile, as illustrated in FIG. 5, an outwardly flaring hollow space 30 is accommodated within the core section 25. A central stem 27 formed in the hollow space 30 serves as a support for the core section 25. In addition, several air bypasses 31 that connect the hollow space 30 and the outside air, are formed in the ceiling wall of the core section 25.

The lower edge of the stem 27 of the core section 25 is connected to a neck section 26 protruding from the center of the ceiling wall of the cavity section 24, thereby permitting the core section 25 and the cavity section 24 that have the above internal structures to be formed integrally. An airflow pipe 32 has an opening formed in the external wall of the cavity section 24, passes through the wall of the cavity section 24, penetrates through the central parts of the neck section 26 and the stem 27, and has another opening in the ceiling wall of the core section 25 where it is connected to the outside air. The preformed article 22 disposed on the core section 25 is blown through injection of air via the airflow pipe 32 and is transferred toward the female member 8 that is positioned vertically above the core section 25. At this time, if the injected air flows along the inner wall of the preformed article 22, a suction effect occurs between the inner wall of the preformed article 22 and the outer wall of the core section 25, whereby the preformed article 22 cannot be blown away. Therefore, in order to prevent such a phenomenon to occur, provision is made such that air enters into the air bypasses 31, pass through the hollow space 30 and is suitably exhausted.

As illustrated in FIG. 6 and FIG. 7, the stacking device 10 is arranged so as to keep the preformed articles 22 stacked in a stand-by condition and as to supply a preformed article 22 to the transfer mold 7 when the transfer mold 7 was moved to a position where the central axis of the stacking device 10 and the central axis of the transfer mold 7 are joined by a vertical line. Hereinafter, the position where the central axes of the members 4 and 8 and the central axis of the transfer mold 7 are joined by a vertical line will be referred to as the position vertically above or below the member 4 or 8. Similarly, the position where the central axis of the stacking device 10 and the central axis of the transfer mold 7 are joined by a vertical line will be referred to as the position vertically below the stacking device 10. The preformed articles 22 are inscribed and maintained by four parallel and upright guiding poles 33. The lowest of the stacked preformed articles 22 is maintained and prevented from falling by a stopper 34, belonging to releasing means. The stopper 34 is installed in the vicinity of a lip section 36 formed in an annular shape at the brim portion of the preformed article 22, and is formed integrally with a stripper 35 belonging to the releasing means. A wedge for pushing down the lip section 36 of the preformed article 22, is fixed on the internal wall of the stripper 35. The stripper 35 is fixed on a shaft 37 that is installed horizontally along the longitudinal direction of the transferring device 14 at a position corresponding to the brim portion of the lowest of the preformed articles 22 and on the front side of the apparatus for forming finished articles as illustrated in FIG. 2. A shaft 37' is disposed in parallel with the shaft 37 at a position corresponding to the brim portion of the lowest preformed article 22 and on the rear side of the apparatus for forming finished articles (see FIG. 6 and FIG. 7). Another stopper 34 and another stripper 35 are accommodated on the shaft 37' in the same fashion as described above. The shafts 37 and 37' are respectively connected with an air cylinder, not shown, accommodated in the releasing device 11 (see FIG. 2).

With the above arrangement, when the transfer mold 7 is moved to a position vertically below the stacking device 10, the air cylinder of the releasing device 11 is actuated and the shafts 37 and 37' are moved together with the pair of stoppers 34 and the pair of strippers 35 disposed on the stacking device 10. At this time, wedges accommodated in the strippers 35 push down the lip sections 36 of the lowest preformed article 22 on both sides, and the stoppers 34 cancel their stopper function so that the preformed article 22 that was pushed down, falls due to its own weight. Here, the preformed article 22 to be released next is blocked by the strippers 35 and does not fall. When the shafts 37 and 37' are moved and cause the stoppers 34 and strippers 35 to return to their original positions, the stacked preformed articles 22 drop by a distance corresponding to the height of the preformed article 22 from which the height of the portion overlapped by another preformed article 22 is subtracted. With the above releasing system, one preformed article 22 is accurately supplied to the core section 25 of the transfer mold 7 for each forming operation of the finished articles 23.

Figure 14C:
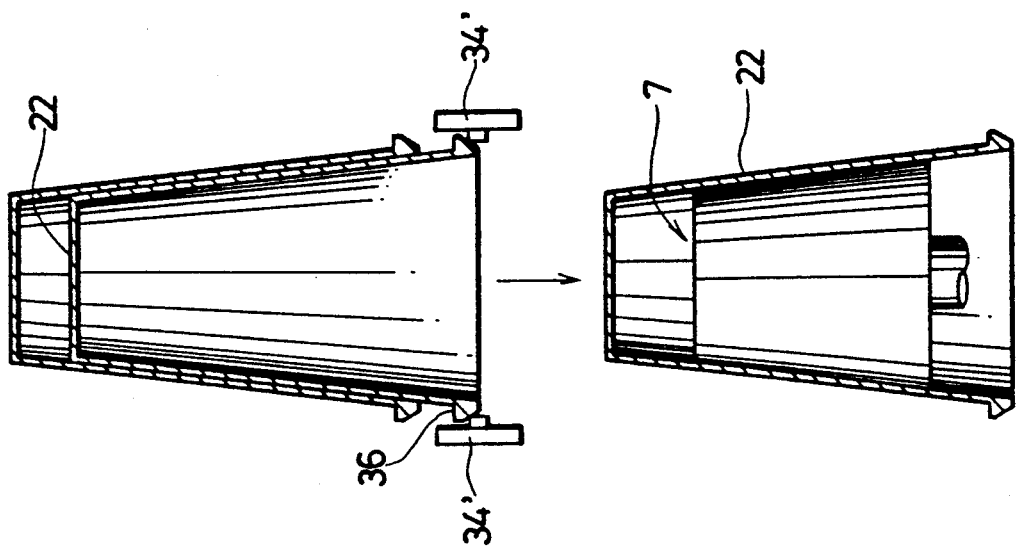
FIG. 14 is an explanatory view showing how a stopper accommodated in the stacking device supports the preformed articles.
Figure 14B:
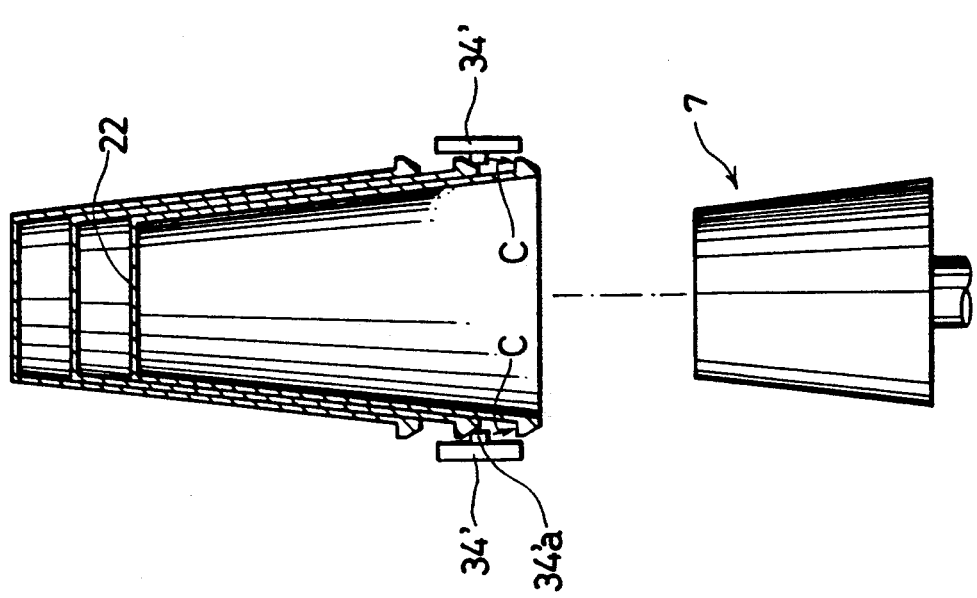
Figure 14A:
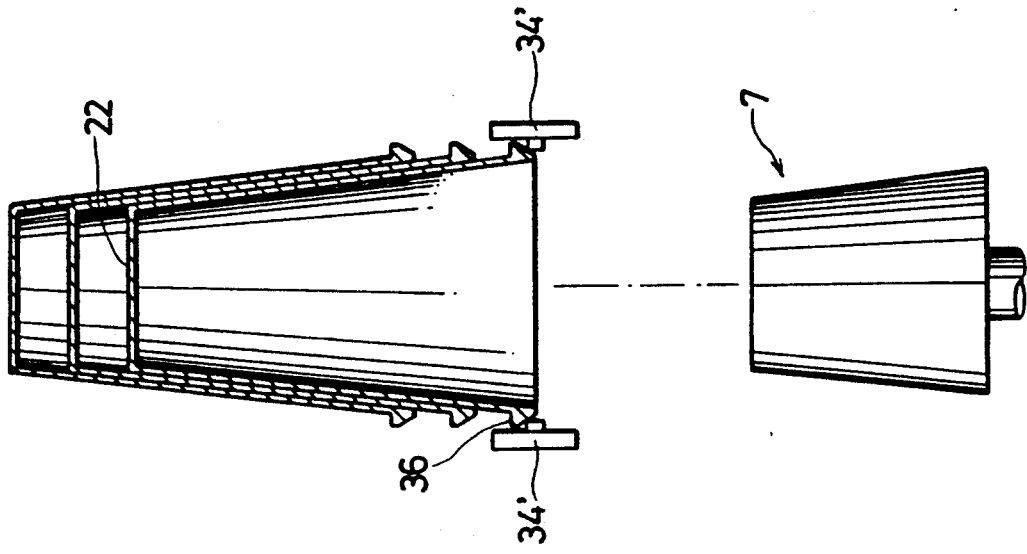

The above releasing system may be also arranged as illustrated in FIG. 14 and FIG. 15. Namely, as illustrated in FIG. 14(a), a pair of stoppers 34' maintain the lip section 36 of the lowest preformed article 22 on both sides. At each opening and closing operation of the pair of stoppers 34', the stacked preformed articles 22 drop due to their own weight by a distance corresponding to the height of the preformed article 22 from which the height of the portion overlapped by another preformed article 22 is subtracted, thereby setting the lowest preformed article 22 free. Meanwhile, as illustrated in FIG. 15(a), two air injection nozzles 45 are disposed symmetrically with respect to the central axis of the preformed article 22 at positions other than the positions where the stoppers 34' are mounted. As illustrated in FIG. 15(b), the position of the outlets of the air injection nozzles 45 are set such that air is suitably injected toward the lip section 36 of the preformed article 22 when the preformed article 22 is free, as was described above. When, in the condition illustrated in FIG. 15(b), air is injected from the air injection nozzles 45 toward the lip section 36, the preformed article 22 is released and supplied to the transfer mold 7, as illustrated in FIG. 14(c) or FIG. 15(c). The stoppers 34' are disposed such that the longitudinal direction thereof is parallel with or orthogonal to the shaft 37. When a plurality of stacking devices 10 are installed, the pairs of stoppers 34' mounted on the stacking devices 10 are opened and closed simultaneously and in an interlocked fashion irrespectively of their longitudinal direction.

Air injection outlets, or air injection slits may be provided below lip supports 34'a (shown in FIG. 14(b)) formed on the stoppers 34' instead of the air injection nozzles 45. In this case, air is injected toward the lip section 36 of the preformed article 22 in a direction indicated by the arrow C shown in FIG. 14(b) after the preformed article 22 was set free, thereby permitting the preformed article 22 to be released and supplied to the transfer mold 7.

As illustrated in FIG. 8, the sorting device 38 is composed of a stacking section 38a formed in the shape of a hollow cylinder and standing up-right, a lead 38b formed in a semi-cylindrical shape and mounted vertically upon the stacking section 38a such as if a portion of the lateral wall of the stacking section 38a was extended, a selecting stopper 38c disposed between the lead 38b and the stacking section 38a, a photoelectric tube 38d fixed to the lateral wall of the stacking section 38a, and a feed stopper 38e attached to the bottom opening of the stacking section 38a. The aperture of the stacking section 38a and the aperture formed by the pipes composing the stacking device for finished articles 39 mentioned earlier are large enough to allow the storage or the passage of the finished articles 23.

The selecting stopper 38c is for example constituted by a plate that penetrated through and goes out from a slit, not shown, formed in the lateral wall of the lead 38b. Provision is made such that, when a fault is detected during the vacuum degree check performed by the vacuum pressure sensor 42 mentioned earlier, the selecting stopper 38c actuates and penetrates through the slit of the lead 38b thereby preventing the defective article from being supplied to the stacking section 38a. The defective article that was stopped, is for example discarded outside by means of air injected through the lateral wall of the lead section 38b. When the finished article 23 is judged to be conforming, the selecting stopper 38c does not actuate whereby the conforming article falls freely within the stacking device 38a without being obstructed. The photoelectric tube 38d is a sensor employed for detecting the number of conforming finished articles 23 that fall freely within the sorting device 38.

Another concrete example of selecting stopper 38c will discussed hereinbelow. As illustrated in FIG. 16(a), the selecting stopper 38c is composed of a defective article discharging cylinder 38f, a piston section 38g, a defective article receptacle supporting section 38h fixed in an up-right position at the tip of the piston section 38g, and a defective article receptacle 38i formed in the shape of a plate and fixed horizontally on the defective article receptacle supporting section 38h. As mentioned earlier, the selecting stopper 38c is not actuated when the finished article 23 is judged to be conforming. On the other hand, when the finished article 23 is judged to be defective, the piston section 38g is dispatched out of the defective article discharging cylinder 38f, and the defective article is intercepted by the defective article receptacle 38i, as illustrated in FIG. 16(b). The piston section 38g is then drawn into the defective article discharging cylinder 38f, causing the defective article to be moved outside as illustrated in FIG. 16(c). In the state illustrated in FIG. 16(c), provision is made such that, for example, the piston section 38g rotates thereby inclining the defective article receptacle 38i, and permitting the defective article to be discharged. The implementation of the defective article receptacle 38i is not necessary, and provision may be made such that the defective article is discharged according to the following arrangement. Namely, the defective article receptacle supporting section 38h is shifted until it reaches the vicinity of the central axis of the sorting device 38, and provision is made such that the defective article is collected by the up-right defective article receptacle supporting section 38h. The piston section 38g then rotates thereby inclining the defective article receptacle supporting section 38h, and the defective article is discharged.

When, as illustrated in FIG. 9, the finished articles 23 stacked in the stacking device for finished articles 39 reach a predetermined number, the feed stopper 38e actuates and suspends the supply of finished articles 23 to the stacking device for finished articles 39. At the same time, an alarm or other device indicates that the stacking device for finished articles 39 needs to be replaced. Provision is made such that the finished articles 23 are stacked within the stacking section 38a while the feed stopper 38e is actuated and the supply of the finished articles 23 to the stacking device for finished articles 39 is suspended. The manufacturing process of the finished articles 23 thus does not have to be stopped. Here, when a plurality of transfer molds 7 are installed, the process for selecting the defective articles and the process for counting the number of conforming articles are carried out independently in each of the sorting devices 38.

A method for forming cups of expanded resin using the above-mentioned apparatus will be discussed hereinbelow with reference to FIG. 1 and FIGS. 10 to 12.

Examples of raw material of expandable thermoplastic resin used for forming cups of expandable resin include homopolymers or copolymers of styrene, ethylene, propylene etc., or mixture of these polymers to which a suitable foaming agent is impregnated.

Figure 1:
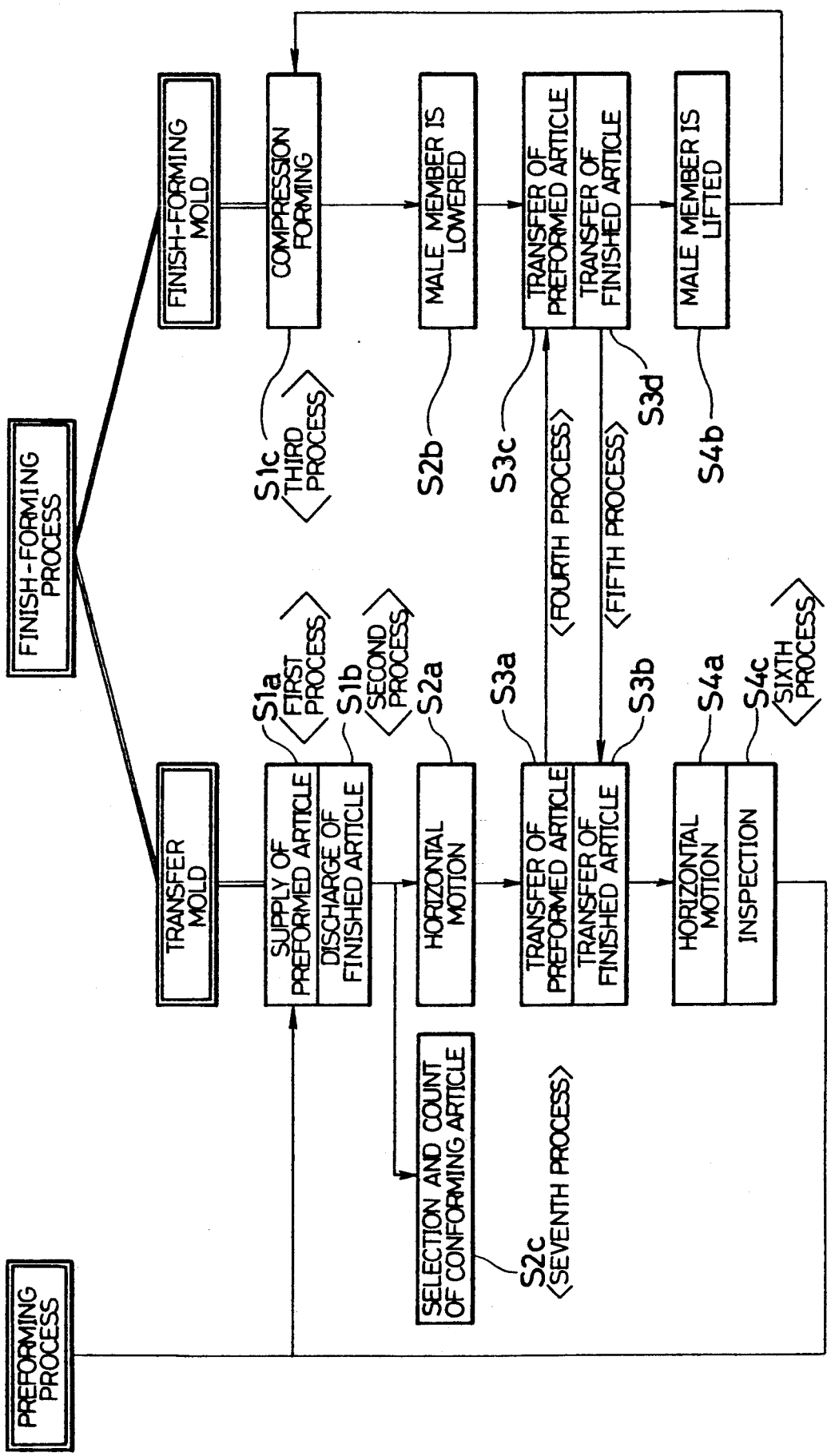

FIG. 1 shows a flow chart illustrating a forming method of forming finished articles 23 (hereinafter referred to as finish-forming method) used for manufacturing cups of expanded resin in accordance with the present invention. Processes designated by the same step number such as for example S1a, S1b, S1c, are executed simultaneously.

First, a sequence of operations performed in the finish-forming mold will be discussed.

Figure 10:
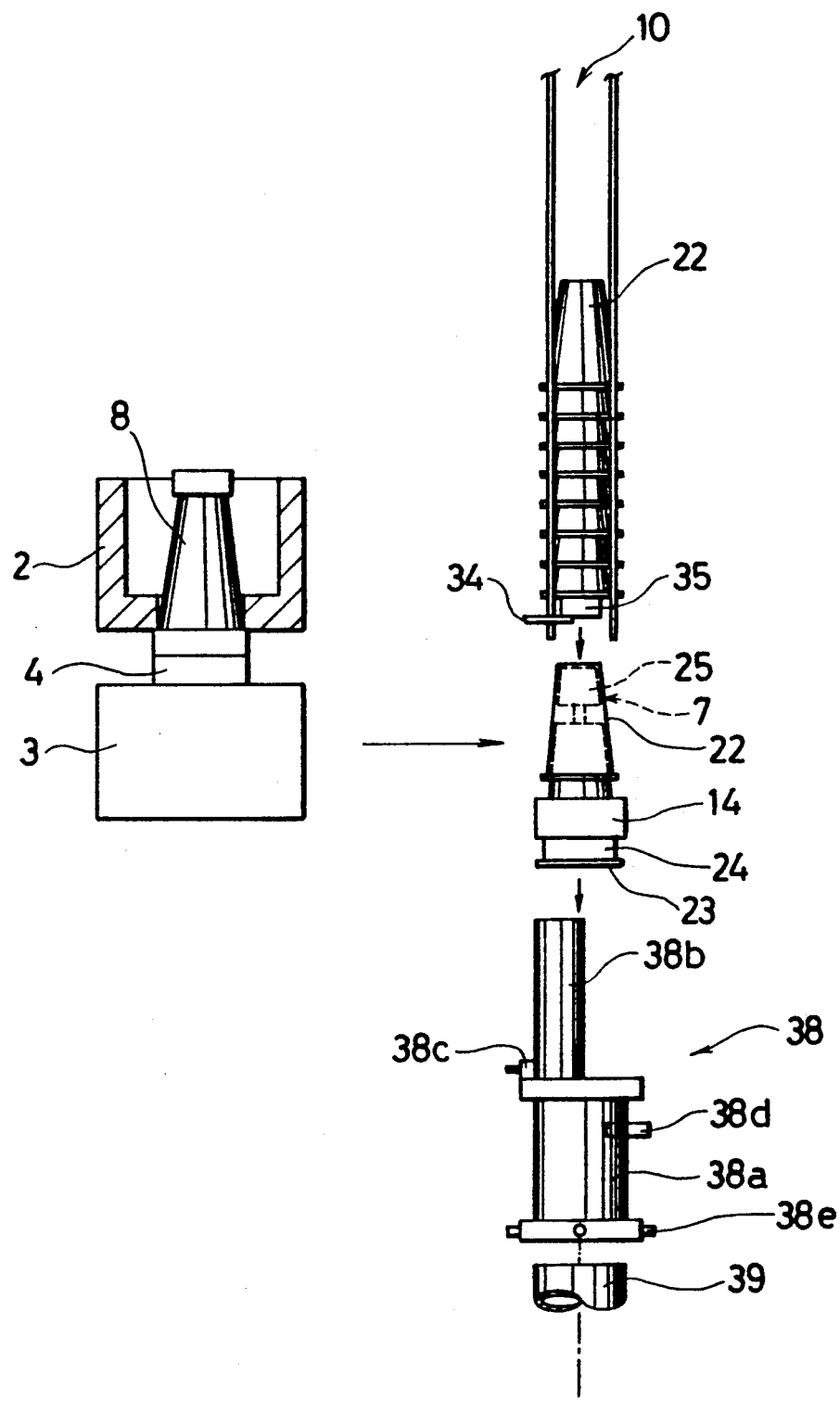

As illustrated in FIG. 10, the mobile frame 3 is moved upward causing the male member 4 mounted on the mobile frame 3 to be lifted up to its highest position (S4b), and the male member 4 and the female member 8 mounted on the fixed frame 2 to close. Here, the shape of the mold cavity, not shown, defined by the female member 8 and the male member 4, coincides with the shape of the finished article 23. During a third process, i.e. finish-forming (compression forming), a preformed article 22 of a size larger than the above mold cavity is placed in the female member 8, and after the finish-forming mold composed of the female member 8 and male member 4 closed, the preformed article 22 is heated indirectly through steam or other method and compressed simultaneously, and cooled by means of cooling water or other method. A finished article 23 is thus obtained (S1c).

Figure 11:
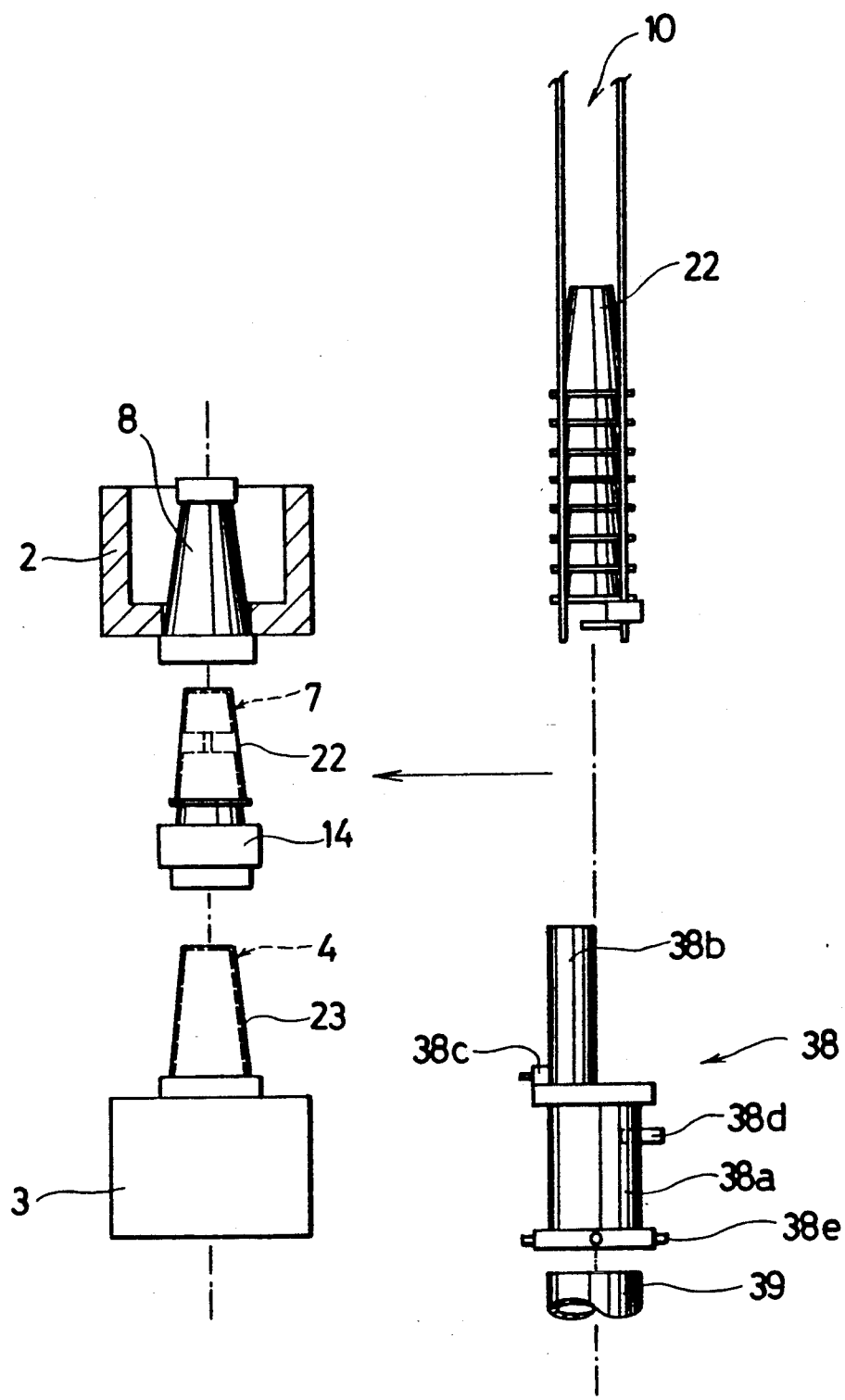

After the finished article 23 was obtained through compression molding, the finish-forming mold is opened and at the same time, air is blown between the female member 8 and the finished article 23 through the air opening and airflow pipe accommodated in the female member 8, causing the finished article 23 to be placed on the male member 4. The mobile frame 3 is then lowered after the finished article 23 was placed upon the male member 4, as illustrated in FIG. 11, (S2b).

Figure 12:
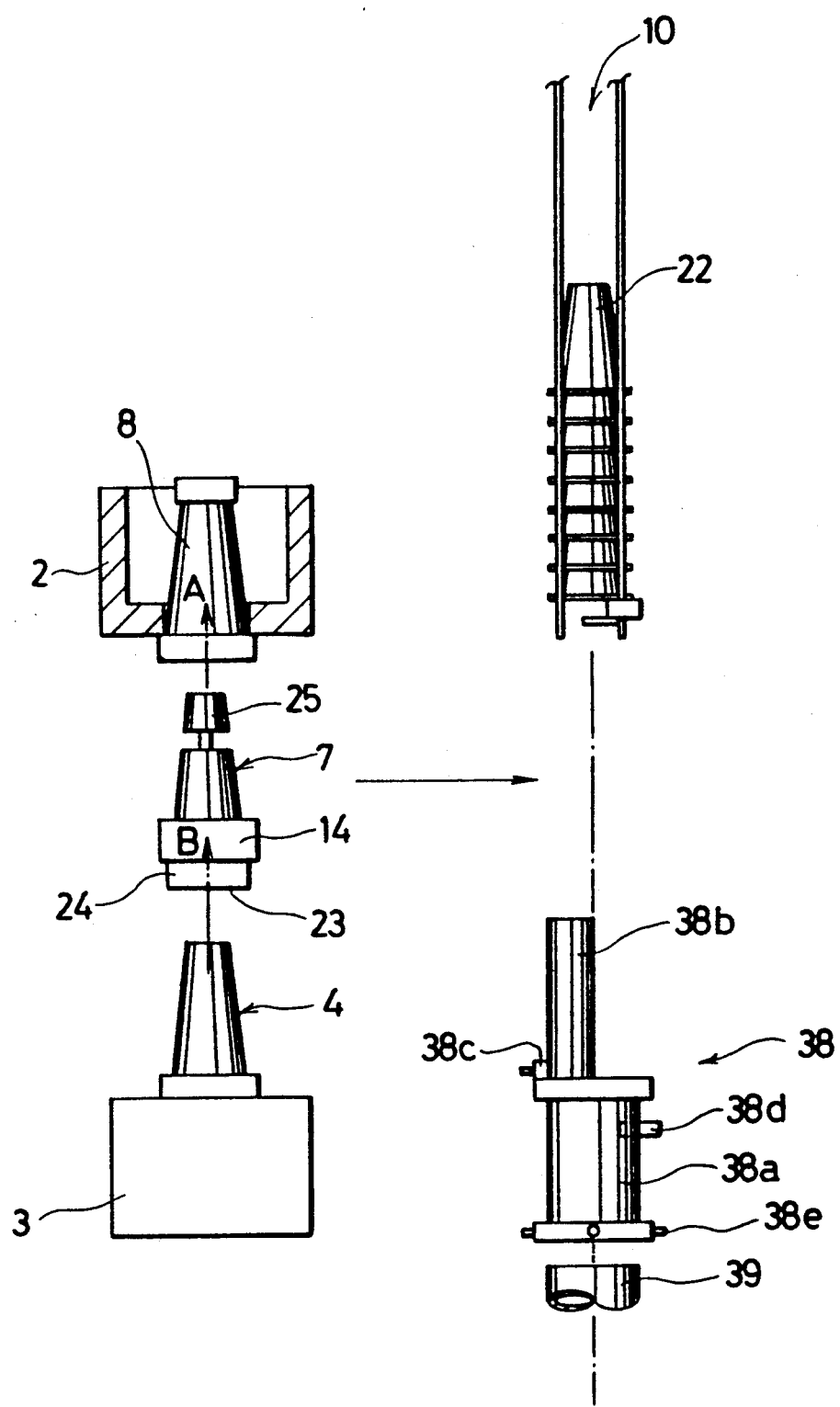

At the time the male member 4 whereon the finished article 23 is placed reached its lowest position, the transfer mold 7 on which core section 25 a preformed article 22 is disposed, is positioned vertically below the female member 8. Then, as illustrated in FIG. 12, air is injected through the airflow pipe 32 (see FIG. 5) that has an opening on the ceiling wall of the core section 25, causing the preformed article 22 placed upon the transfer mold 7 to be blown and transferred toward the female member 8 as shown by the arrow A of FIG. 12 (fourth process, S3c). At this time, air is also aspirated in the female member 8 whereby the air pressure within the interstice between the female member 8 and the preformed article 22 diminishes. The preformed article 22 is therefore maintained in the female member 8 by the outer pressure.

Meantime, air is similarly injected through the airflow pipe formed in the male member 4 and is blown off from the air injection outlet formed on the ceiling wall of the male member 4. As a result, the finished article 23 placed upon the male member 4 is blown and transferred to the cavity section 24 accommodated in the transfer mold 7 as shown by the arrow B in FIG. 12 (fifth process, S3d).

The male member 4 ascends once again toward the female member 8 where the preformed article 22 is held, and the process returns to the initial step S1c. One cycle of the sequence of finish-forming operations performed in the finish-forming mold is thus complete.

A sequence of operations performed in the transfer mold 7 will be discussed hereinbelow.

As illustrated in FIG. 10, while during the step S1c the compression forming of a finished article 23 is being carried out in the finish-forming mold, the transfer mold 7 mounted on the transferring device 14 is moved to a position vertically below the stacking device 10 and vertically above the sorting device 38. Here, a first process is carried out, i.e. the stacking device 10 releases one preformed article 22 (S1a). Simultaneously with the first process, a second process is executed, i.e. air is injected through the airflow pipe 28 (see FIG. 5) accommodated in the cavity section 24, thereby permitting the finished article 23 that was transferred from the male member 4 to the transfer mold 7 in the above-mentioned step S3d, to be discharged from the cavity section 24 and to be sent to the sorting device 38 (S1b).

Thereafter, as illustrated in FIG. 11, the transfer mold 7 on which core section 25 the preformed article 22 is placed, is moved horizontally to a position vertically below the female member 8 (S2a).

While the transfer mold 7 is being shifted horizontally, the finished article 23 is either discharged from or passes through the sorting device 38. Namely, when the finished article 23 was determined to be defective during a sixth process, i.e. an inspection (to be covered later), performed in the cavity section 24, the selecting stopper 38c is actuated and prevents the defective article from falling freely into the stacking section 38a. The defective article is then removed from the lead section 38b and discharged outside. When the finished article 23 is judged to be conforming, the selecting stopper 38c is not actuated whereby the conforming finished article 23 falls freely into the stacking section 38a and is counted as conforming article by the photoelectric tube 38d (seventh process, S2c). The conforming finished article 23 further drops into the stacking device for finished articles 39 where it is stacked.

Then, air is injected through the airflow pipe 32 (see FIG. 5) that has an outlet formed in the ceiling wall of the core section 25, causing the preformed article 22 to be transferred to the female member 8 as shown by the arrow A of FIG. 12 (fourth process, S3a). Meanwhile, the finished article 23 placed upon the male member 4 is blown and transferred to the cavity section 24, as shown by the arrow B in FIG. 12 (fifth process, S3b), and is retained in the cavity section 24 where air was exhausted through the airflow pipe 28. Then, the transfer mold 7 is shifted horizontally to a position vertically below the stacking device 10 in an interlocked fashion with the male member 4 that is moved to its uppermost position (S4a).

The sixth process mentioned earlier, namely an inspection for determining whether the finished article 23 is a conforming or a defective article, is carried out (S4c), while the transfer mold 7 is being shifted horizontally. The inspection process consists in exhausting air from the cavity section 24 by means of the vacuum device with a suction speed controlled through the throttle valve 43 and so as to obtain a vacuum pressure controlled through the vacuum pressure regulator 44, then measuring the vacuum degree obtained within the interstice between the cavity section 24 and the finished article 23 by means of the vacuum pressure sensor 42 and comparing this vacuum degree with a predetermined vacuum degree serving as reference.

The process returns once again to steps S1a and S1b and one cycle of the sequence of finish-forming operations performed in the transfer mold 7 is thus complete. When during the step S2c, the finished articles 23 stacked within the stacking device for finished articles 39 reach a predetermined number, the feed stopper 38e is activated and prevents the finished articles 23 to be supplied from the stacking section 38a to the stacking device for finished articles 39 while at the same time an alarm or the like indicates that the stacking device for finished articles 39 needs to be replaced. The finished articles 23 are temporarily stacked in the stacking section 38a until the stacking device for finished articles 39 is replaced. The finish-forming cycle thus does not have to be suspended. In addition, the count of the stacked finished articles 23 is executed within the stacking device for finished articles 39 whereby the finished articles 23 only need to be packed in a crating material or the like and shipped thereafter.

As described earlier, the transferring device 14 whereon the transfer mold 7 is mounted, moves horizontally back and forth in an interlocked fashion with the mobile frame 3 due to the action of the sliding connectors 21 that are sliding along the horizontal shafts 20, and of the connecting rods 13. Such an arrangement ensures that the central axis of the transfer mold 7 is joined by a vertical line with the central axes of the female member 8 and the male member 4, and with the central axes of the sorting device 38 and the stacking device for finished articles 39, respectively. This arrangement therefore ensures that the transfer mold 7 does not come in contact with the female member 8, and that the supply and transfer of the preformed articles 22 and the transfer and discharge of the finished articles 23 are executed accurately.

Figure 17:
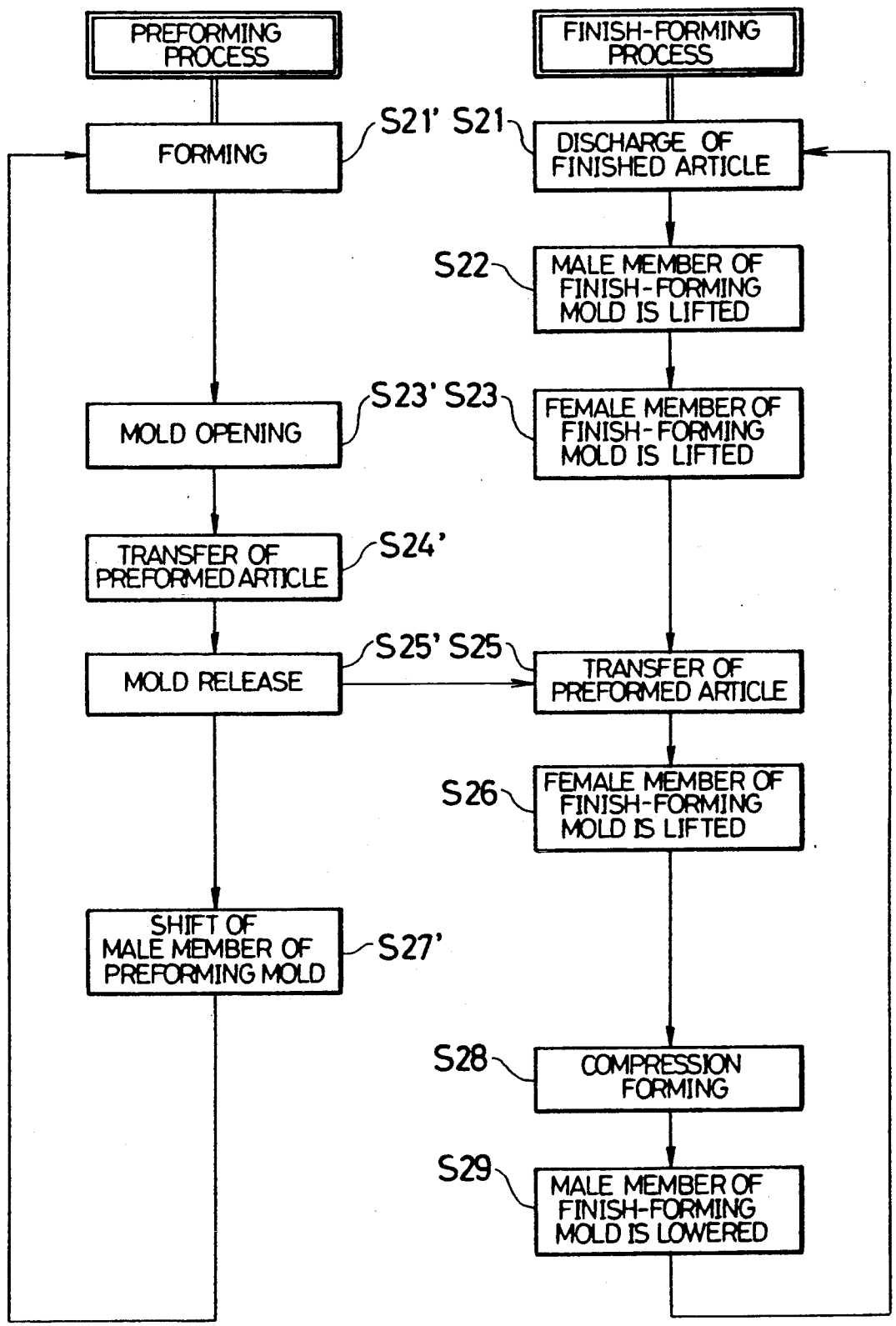
FIG. 17 is a flow chart illustrating a conventional process for forming cups of expanded resin.

As described above, the supply of preformed articles 22 during the finish-forming process is performed continuously. The finish-forming process may be thus conducted as if it were an independent process and does not have to be subordinated to the supply of each preformed article 22, as was the case for the conventional forming process example described with reference to FIG. 17. Besides, the supply of the preformed article 22 to the transfer mold 7 (S1a, first process), the discharge of the finished article 23 from the transfer mold 7 (S1b, second process), and the compression forming within the female member 8 and the male member 4, i.e. the forming of the finished article 23 (S1c, third process) are conducted simultaneously. In addition, the transfer of the preformed article 22 to the female member 8 (S3a and S3c, fourth process), and the transfer of the finished article 23 to the transfer mold 7 (S3b and S3d, fifth process) are carried out simultaneously. Furthermore, the inspection of the finished article 23 (step S4c, sixth process) as well as the selection and the count of the conforming articles (step S2c, seventh process) are conducted while the transfer mold 7 is being moved.

Accordingly, the supply of a preformed article, the discharge of a finished article and the forming of a finished article are conducted within the same time as that needed for the discharge of a finished article when a conventional method is adopted. In addition, the cycle of a sequence of finish-forming operations including the inspection and the selection process of finished articles is shorter than that of a conventional method. The above arrangement thus permits to significantly reduce the time necessary to perform the whole manufacturing process of cups of expanded resin.

As described above, with the method of forming finished cups of expanded resin in accordance with the present invention, the first process consisting in feeding the preformed articles is conducted continuously and independently thereby permitting a savings of the time of waiting for the preformed articles to be supplied during the finish-forming process. With a conventional method, time is needed for each process namely: the supply of a preformed article; the forming of the finished article; and the discharge of the finished article. However, with the finish-forming method of the present invention, the second process where a finished article is discharged and the third process where another finished article is formed are conducted simultaneously with the first process, i.e. the supply of a preformed article. The forming cycle of cups of expanded resin may be thus shortened.

Moreover, the fourth process consisting in transferring the preformed article from the transferring means to the finish-forming mold, and the fifth process consisting in transferring the finished article after it was formed from the finish-forming mold to the transferring means, are carried out simultaneously. Such an arrangement permits the compression forming performed in the finish-forming mold and the discharge of the finished article performed in the transferring means to be conducted efficiently.

Furthermore, both the sixth process, i.e. the inspection of the finished article, and the seventh process, i.e. the selection and the count of the conforming articles are conducted while the transferring means is being moved. An inspection process thus does not need to be conducted separately. Such an arrangement therefore contributes considerably to a reduction of the labor of the equipment for forming cups of expanded resin, as well as to a reduction in the time required to execute all the processes.

With the apparatus for forming finished cups of expanded resin in accordance with the present invention, the transferring means is shifted by the moving means to a position where the central axis of the transferring means is joined by a vertical line with the central axes of the feeding means and sorting means. The preformed article is thus accurately supplied to the core section of the transferring means while at the same time, the finished article is accurately discharged to the sorting means from the cavity section formed in the transferring means. In addition, the transferring means is shifted by the moving means to a position where the central axis of the transferring means is joined by a vertical line with the central axis of the finish-forming mold. As a result, after it was supplied to the core section of the transferring means, the preformed article may be transferred to the finish-forming mold accurately and rapidly. Similarly, the finished article may be transferred accurately and rapidly to the cavity section formed in the transferring means.

The above arrangement also offers the advantage that the conforming articles stacked in the sorting device are counted and may be thus packed in a crating material and shipped without any further labor.

Accordingly, the supply of a preformed article, the discharge of a finished article and the compression forming of another finished article are conducted simultaneously and accurately within the time needed for the discharge of a finished article when a conventional method is adopted. Moreover, the cycle for forming finished articles is shorter than that of a conventional method and includes the processes of inspection, count and stacking of the conforming articles. Such an arrangement therefore contributes considerably to a reduction of the labor of the equipment for forming cups of expanded resin, as well as to a reduction in the time required to execute all the processes, and an enhanced production efficiency.

The invention being thus described, it will be obvious that the same may be varied in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. A method of forming finished cups of expanded resin employing transferring means capable of a) transferring a performed article that was supplied thereto, to a finish-forming mold for subjecting said preformed article to a process for forming finished articles, said preformed article being obtained through a process for forming preformed articles by filling a mold cavity formed in a preforming mold with expandable thermoplastic resin particles and heating said particles such that they are expanded and fused, b) collecting from said finish-forming mold a finished article that was formed by heating and compressing said preformed article in said finish-forming mold and whose wall thickness is thinner than the wall thickness of said preformed article, and c) discharging said finished article, and said method comprising the steps of:

a first step of supplying a first preformed article to said transferring means after said first preformed article went through said process for forming preformed articles;

a second step of discharging a first finished article from said transferring means;

a third step of heating and compressing a second preformed article in said finish-forming mold and forming a second finished article;

a fourth step of transferring said first preformed article, supplied to said transferring means, to said finish-forming mold; and a fifth step of transferring said second finished article after it was formed from said finish-forming mold to said transferring means, wherein said first step, second step and third step are conducted simultaneously, and said fourth step and fifth step are conducted simultaneously.

2. A method of forming finished cups of expanded resin as claimed in claim 1, further comprising the steps of:

a sixth step of executing a quality control check including an inspection consisting in determining whether each finished article that was transferred from said finish-forming mold is conforming to a desired standard, said sixth step being conducted in said transferring means while said transferring means is being shifted from said fourth and fifth steps to said first, second and third steps, and a seventh step of removing defective articles from said finished articles discharged from said transferring means in accordance with said inspection, and counting conforming articles, said seventh step being conducted while said transferring means is shifted from said first, second and third steps to said fourth and fifth steps.

3. A method of forming finished cups of expanded resin as claimed in claim 1, further comprising the step of keeping said preformed articles to be supplied to said transferring means stacked in a stand-by condition.

4. A method of forming finished cups of expanded resin as claimed in claim 3, wherein the first step further comprises the step of supplying to said transferring means a preformed article which is lowest in the stack.

5. A method of forming finished cups of expanded resin as claimed in claim 3, wherein the first step further comprises a step of supplying to said transferring means a preformed article which is lowest in the stack by allowing said preformed article to fall due to its own weight.

6. A method of forming finished cups of expanded resin as claimed in claim 3, wherein the first step further comprises a step of supplying to said transferring means a preformed article which is lowest in the stack by blowing air into said preformed article.

7. A method of forming finished cups of expanded resin as claimed in claim 1, further comprising the step of:

estimating quality of said first finished article prior to said second step, said second step further including the step of removing said first finished article from said process if said first finished article is a defective product.

8. A method of forming finished cups of expanded resin as claimed in claim 7, wherein the second step further includes the step of preventing a defective first finished article from falling freely onto a conforming article that has been stacked from said transferring means and removing said defective first finished article.

9. A method of forming finished cups of expanded resin as claimed in claim 7, wherein the second step further includes the step of preventing a defective first finished article from falling freely onto a conforming article that has been stacked from said transferring means, and then removing said defective first finished article by applying a force in a lateral direction thereto.

10. A method of forming finished cups of expanded resin as claimed in claim 1, wherein said second preformed article is indirectly heated by a medium in the third step.

11. A method of forming finished cups of expanded resin as claimed in claim 2, wherein the sixth step includes the steps of sucking air from said transferring means to allow said transferring means to hold each finished article, and detecting a degree of vacuum between said transferring means and each finished article.

12. A method of forming finished cups of expanded resin as claimed in claim 11, wherein the sixth step further includes the step of controlling suction pressure and suction rate.

13. A method for forming finished cups of expanded resin as claimed in claim 2, wherein the seventh step further includes the steps of preventing said first finished article from falling freely onto a conforming article that has been stacked from the transferring means if a number of said conforming articles is a predetermined value and outputting an indication that the number of conforming articles has reached the predetermined value.

* * * * *